US010349468B2

(12) United States Patent
Schumacher

(10) Patent No.: US 10,349,468 B2
(45) Date of Patent: Jul. 9, 2019

(54) METHOD FOR PRODUCING A TEXTILE SHEET HEATING ELEMENT

(71) Applicant: KUFNER HOLDING GMBH, Munich (DE)

(72) Inventor: Rolf Schumacher, Balingen (DE)

(73) Assignee: KUFNER HOLDING GMBH, Munich (DE)

( * ) Notice: Subject to any disclaimer, the term of this patent is extended or adjusted under 35 U.S.C. 154(b) by 655 days.

(21) Appl. No.: 14/906,197

(22) PCT Filed: Jul. 3, 2014

(86) PCT No.: PCT/EP2014/064171
§ 371 (c)(1),
(2) Date: Jan. 19, 2016

(87) PCT Pub. No.: WO2015/007533
PCT Pub. Date: Jan. 22, 2015

(65) Prior Publication Data
US 2016/0262209 A1    Sep. 8, 2016

(30) Foreign Application Priority Data

Jul. 19, 2013   (EP) .................................... 13177148

(51) Int. Cl.
*H05B 3/34* (2006.01)
*F23M 5/02* (2006.01)
(Continued)

(52) U.S. Cl.
CPC ........... *H05B 3/345* (2013.01); *B60N 2/5678* (2013.01); *D04B 23/12* (2013.01); *D04B 27/08* (2013.01);
(Continued)

(58) Field of Classification Search
CPC ...... B60N 2/5678; H05B 3/345; H05B 3/347; H05B 3/36; H05B 2203/017;
(Continued)

(56) References Cited

U.S. PATENT DOCUMENTS

| 4,638,647 A | 1/1987 | Grenzendoerfer et al. |
| 4,823,564 A | 4/1989 | Wunner |

(Continued)

FOREIGN PATENT DOCUMENTS

| CN | 1009210 B | 8/1990 |
| CN | 1170969 C | 10/2004 |

(Continued)

OTHER PUBLICATIONS

PCT/EP2014/064171 International Search Report dated Sep. 5, 2014, 3 pages.

(Continued)

*Primary Examiner* — Jimmy Chou
(74) *Attorney, Agent, or Firm* — Fisherbroyles, LLP; Robert Kinberg

(57) ABSTRACT

A method for producing a textile sheet heating element includes forming a knitted material and, in one and the same work step, inserting heat conductors as warp threads. Contact conductors that touch the heat conductors are inserted spaced from one another as weft threads or weft thread groups. A warp knitting machine or Raschel machine is used to produce the sheet heating element. The production speed of the knitting or Raschel machine is varied as a function of stitch formation. The warp knitting machine or Raschel machine has a magazine weft insertion system with feeding chains to feed in weft threads and a weft carriage to insert weft threads. Both the feeding chain and the weft carriage are paused for preset periods as a function of stitch formation.

8 Claims, 6 Drawing Sheets

(51) Int. Cl.
*F23D 14/22* (2006.01)
*F23D 14/32* (2006.01)
*B60N 2/56* (2006.01)
*D04B 23/12* (2006.01)
*D04B 27/08* (2006.01)

(52) U.S. Cl.
CPC .............. *F23D 14/22* (2013.01); *F23D 14/32* (2013.01); *F23M 5/025* (2013.01); *H05B 2203/017* (2013.01); *H05B 2203/029* (2013.01); *Y02E 20/344* (2013.01)

(58) Field of Classification Search
CPC .. H05B 2203/029; D04B 23/12; D04B 25/00; D04B 27/08; F23D 14/22; F23D 14/32; F23M 5/025
USPC ..... 219/202, 529, 539, 544; 66/84 A, 125 R, 66/83, 84 R
See application file for complete search history.

(56) References Cited

U.S. PATENT DOCUMENTS

| | | | | | |
|---|---|---|---|---|---|
| 4,838,043 | A | * | 6/1989 | Jencks | D04B 21/205 66/170 |
| 4,983,814 | A | * | 1/1991 | Ohgushi | D02G 3/441 219/212 |
| 5,241,842 | A | * | 9/1993 | Hagel | D04B 27/32 66/204 |
| 5,669,248 | A | * | 9/1997 | Mista | D04B 27/02 66/205 |
| 6,229,123 | B1 | * | 5/2001 | Kochman | A41D 13/0051 219/529 |
| 6,276,174 | B1 | * | 8/2001 | Wunner | D04B 23/12 66/125 R |
| 6,294,770 | B1 | * | 9/2001 | Hasegawa | D04B 21/12 219/201 |
| 6,691,534 | B1 | * | 2/2004 | Schonauer | D04B 35/18 66/157 |
| 8,171,755 | B2 | * | 5/2012 | Jahn | D04B 1/16 66/170 |
| 9,963,808 | B2 | * | 5/2018 | Yamaguchi | D04B 21/14 |
| 2001/0024918 | A1 | * | 9/2001 | Albin | D03D 15/00 442/310 |
| 2006/0281382 | A1 | * | 12/2006 | Karayianni | D03D 1/0088 442/181 |
| 2008/0245786 | A1 | * | 10/2008 | Sharma | H05B 3/347 219/529 |

FOREIGN PATENT DOCUMENTS

| | | |
|---|---|---|
| CN | 101339425 A | 1/2009 |
| DE | 1981644 C1 | 7/1999 |
| EP | 1815717 B1 | 5/2008 |
| EP | 2014811 A1 | 1/2009 |
| JP | 61-201058 A | 9/1986 |
| JP | 06-151045 A | 5/1994 |
| JP | 2000-8257 A | 1/2000 |
| TW | I383706 B | 1/2013 |
| WO | 2006/056414 A1 | 6/2006 |

OTHER PUBLICATIONS

First Office Action in Chinese Patent Application No. 201480036419.0 (submitted with English translation).
Second Office Action in Chinese Patent Application No. 201480036419.0 (English translation only).
Third Office Action in Chinese Patent Application No. 201480036419.0 (English translation only).
Office Action in Taiwanese Patent Application No. 103123384 (English translation only).

* cited by examiner

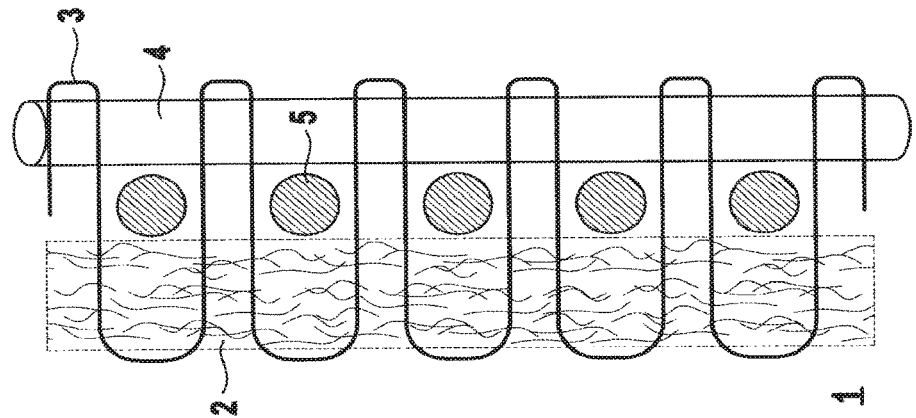
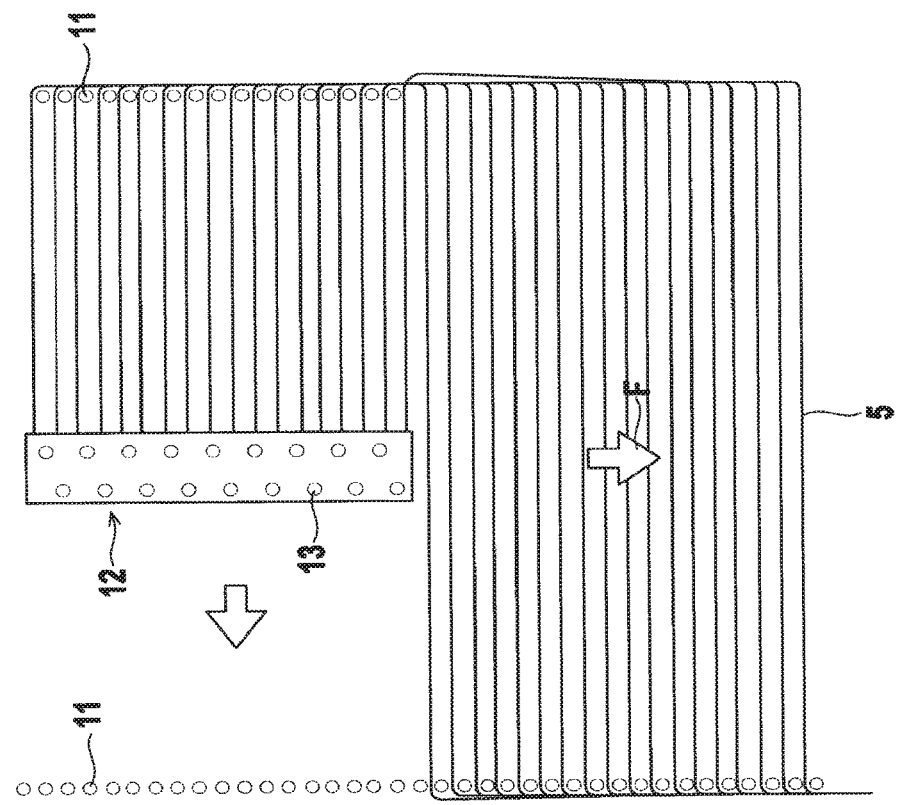

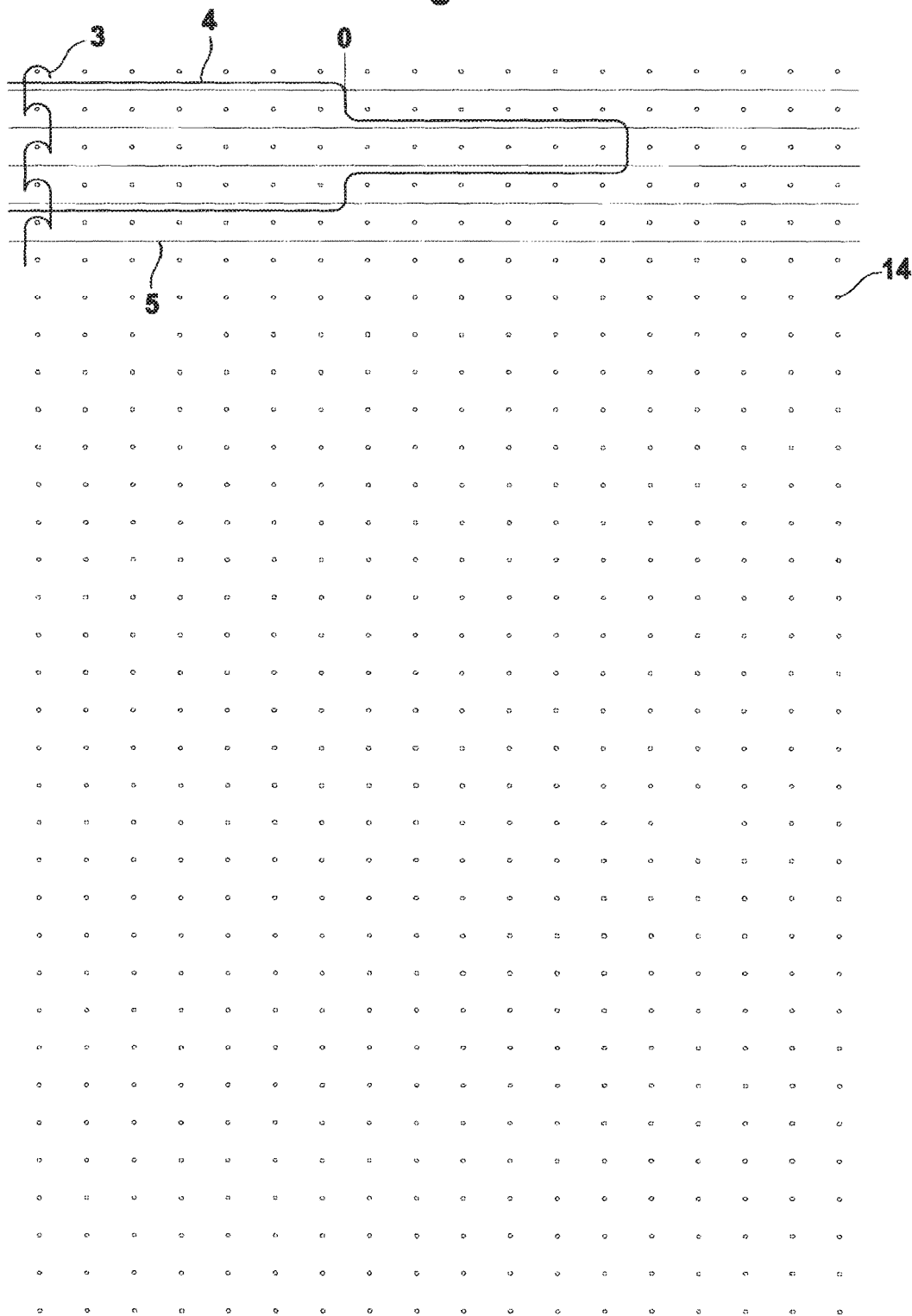

METHOD FOR PRODUCING A TEXTILE SHEET HEATING ELEMENT

CROSS-REFERENCE TO RELATED APPLICATIONS

This application is a U.S. National Stage of International Stage Application No. PCT/EP2014/064171, filed Jul. 3, 2014, claiming priority to European Patent Application No. 13177148.7, filed Jul. 19, 2013, the priority of which is claimed herein.

BACKGROUND OF THE INVENTION

The invention concerns a method for producing a textile sheet heating element.

Such a method is known from EP 1 815 717 B1. The method described in that document serves in particular to produce sheet heating elements used in seat heaters in the automotive sector. In accordance with this method, by means of machine knitting, a base material, for example a non-woven material, is pierced with a knitted material.

In one and the same work step, by machine knitting, heat conductors are inserted at least partly as warp threads and contact conductors that touch the heat conductors are inserted at spacings from one another as weft threads or weft thread groups, such that the heat conductors and contact conductors are an integral component of the base material.

One advantage of this method is that the heat conductors and contact conductors are integrated into the sheet heating element in one work step along with the production of the knitted material itself, the result being a significant streamlining advantage in the production of the sheet heating elements, compared to previously known methods in which the contact conductors and heat conductors had to be integrated into the sheet heating element in a multi-step process.

The invention aims to solve the problem of providing a method of the aforementioned type which enables further improved, streamlined manufacturing of sheet heating elements with high functionality. Advantageous embodiments and expedient further developments of the invention are described in the dependent claims.

SUMMARY OF THE INVENTION

The invention concerns a method for producing a textile sheet heating element in which a knitted material is formed, and the heat conductors are inserted in a knitting process as warp threads in one and the same work step. The contact conductors that touch the heat conductors are introduced at spacings from each other as weft threads or weft thread groups. To produce the sheet heating element, a warp knitting machine or Raschel machine is used, the production speed of which varies as a function of stitch formation. The warp knitting machine or Raschel machine has a magazine weft insertion system with feeding chains to feed in weft threads and a weft carriage to insert weft threads. Alternatively or additionally, to vary the production speed, both the feeding chains and the weft carriage are paused for preset times determined as a function of stitch formation.

The sheet heating element pursuant to the invention is generally characterized in that homogeneous heat distribution is achieved across the entire area of the sheet heating element since the heat conductors inserted as warp threads form a multiple arrangement of threads lying densely adjacent to one another in the knitted material. An additional significant advantage is the low energy input required to produce heat using the sheet heating element pursuant to the invention.

In accordance with a first aspect of the method, the production speed varies during production of the knitted material as a function of stitch formation, so that the mean production speed can be significantly increased as compared to a constant production speed, which saves a considerable amount of time and results in shorter machine run-times in the production of the sheet heating element pursuant to the invention.

The invention is therefore based on the insight that the complexity of producing the sheet heating element varies locally with regard to the individual stitches of the knitted material. This is due to the circumstance that, on one hand, the contact conductors are only inserted locally as weft threads, either individually or as groups, and the structure of the heat conductors in the area of these contact conductors is more complex than in the area between the contact conductors, especially in order to produce the best possible contact between the heat conductors and the contact conductors. The method pursuant to the invention takes this circumstance into account by necessarily reducing the production speed in the areas where the knitted material exhibits a complex structure. However, in areas where the knitted material exhibits less complexity, the production speed is increased, so that overall a higher average production speed is achieved.

In accordance with a second aspect of the invention, the warp knitting machine or Raschel machine used to produce the sheet heating element pursuant to the invention has a magazine weft insertion system with feeding chains to feed in weft threads and a weft carriage to insert weft threads, in which system both the feeding chains and the weft carriage are paused for preset times determined as a function of stitch formation.

Thus it is possible to considerably reduce, in a surprisingly straightforward manner, the amount of expensive conducting material used to construct the contact conductors that is rejected as waste.

The contact conductors are only inserted into the knitted material locally or in individual groups, and the contact conductors delimit the individual sheet heating elements obtained by knitting; that is, the distances between these contact conductors are relatively large.

To insert the contact conductors locally in the knitted material, the weft carriage does not move continuously, but rather pauses for preset periods. If only the weft carriage were to be paused and the feeding chain were to continue to run, the weft threads forming the contact conductors would continue to be conveyed on the feeding chains. This would result in a border of weft threads along each edge of the knitted material that would be rejected as waste once the knitted material is cut into individual sheet heating elements. Since pursuant to the invention, not only the weft carriage but also the weft carriage and the feeding chain are paused synchronously for preset times, this rejection of weft threads as waste is avoided entirely.

The magazine weft insertion system pursuant to the invention with a control unit by means of which the weft carriage and the feeding chain are paused for preset times as a function of stitch formation during the material knitting process, can be used for warp knitting machines in general, and Raschel machines in particular. Use of the magazine weft insertion system pursuant to the invention is especially advantageous when expensive weft threads are used for which any waste would result in significant costs.

The variation of the production speed pursuant to the invention, as a function of stitch formation in the knitted material, can also generally be used in warp knitting machines, and Raschel machines in particular, in which case a suitable control unit is provided as well.

A pulse controller may be employed to control production speed or also control pause times for the feeding chains and the weft carriage of the magazine weft insertion system in accordance with the method pursuant to the invention. From suitable machine elements used to form stitches in the knitted material the pulse controller receives a pulse sequence in time with stitch formation, and this sets the production speed and/or pause times in the control unit without any additional sensor equipment. It is regarded as advantageous for the control unit to have parameterizable software to allow the production speed or weft carriage and feeding chain pause times to be optionally varied on an application-specific basis.

In principle, the surface heating element produced using the method pursuant to the invention can consist solely of the knitted material formed by the fringe stitches along with the heat conductors and contact conductors inserted into it, with the heat conductors and contact conductors being generally made of conductive materials, such as carbon.

According to an alternative embodiment, a base material is used, in particular a non-woven material, which is pierced by the knitted material.

In this regard, the heat conductors and contact conductors are connected to the base material and fastened in place by the fringe stitches.

In both cases, the heat conductors and contact conductors are inserted into the knitted material such that they touch at contact points, so that a conductive contact exists between them and therefore electricity will flow via the contact conductors to the heat conductors.

According to an especially advantageous further development, the heat conductors form stitches that surround the contact conductors.

This improves yet further the contact between the heat conductors and contact conductors.

Especially when the heat conductors do not form any stitches that surround the contact conductors, the contact of the latter with the heat conductors may be reduced, depending on the arrangement of the contact conductors. This is the case in particular when a sheet heating element is delimited by a group of contact conductors. In such cases, the last contact conductor can often have reduced electrical contact to the heat conductor, such that when electricity is applied, a great deal of heat results. This results in undesirable limitation of heating output.

This undesired effect can be avoided in a surprisingly straightforward manner by additionally inserting in this area an insulation thread made of non-conductive material as a weft thread that then presses against the contact conductor.

In accordance with one embodiment of the invention, to form the knitted material, fringe stitches are formed using a first guide bar and two guide bars are used to insert the heat conductors in the form of warp threads.

Using two guide bars to insert the heat conductors in the knitted material allows variable patterns to be formed by the heat conductors in the knitted material. In particular, two-dimensional interconnected patterns of heat conductors can be created which serve to give the sheet heating element high heating power.

It is especially advantageous to use the two guide bars to form differing offsets of the heat conductors transverse to the running direction of the feeding chain.

In this connection, the offsets are equivalent to +/−1.5 inches relative to a base line.

The offsets created in this manner form long segments of the heat conductors that are in contact with the contact conductors, and this further improves electrical contact between the heat conductors and the contact conductors.

The larger the offsets of the heat conductors are, the more complex the knitting operations become. Since the offsets vary depending on location, the reason for the complexity in the knitting operations is therefore also position-dependent along the length of the knitted material. In accordance with the invention, this position-dependency is taken into account insofar as, in areas where the heat conductors exhibit large offsets, production speed is reduced compared to areas where the heat conductors exhibit smaller offsets, which has the effect of optimizing, i.e. maximizing, production speed.

The sheet heating elements produced using the method pursuant to the invention can be employed especially advantageously in motor vehicles. In this connection, the sheet heating elements can be used to form steering wheel heaters. In addition, the sheet heating elements can be installed within wall claddings of motor vehicles in order to heat their interiors, which is especially advantageous in motor vehicles with electric drive systems.

The sheet heating elements pursuant to the invention can be used especially advantageously to produce seat heaters in motor vehicles. The seats of motor vehicles generally have a top layer whose upper surface forms the surface on which sits a person using the seat. The top layer can consist of leather or fabric. A softer comfort layer serving as upholstery for the seat is located below the top layer.

Since the sheet heating element pursuant to the invention is a soft, flexible knitted material, it can be arranged directly beneath the top layer without compromising the comfort of the seat. This represents a significant advantage over familiar, conventional sheet heating elements which are considerably more rigid and inflexible than the sheet heating element pursuant to the invention and which therefore cannot be installed directly beneath the top layer but must be installed beneath the comfort layer. As a result, the sheet heating element pursuant to the invention saves a considerable amount of energy since the sheet heating element is only required to heat the top layer and is no longer required to heat the comfort layer of the seat in a motor vehicle.

In accordance with an advantageous variant, the sheet heating element pursuant to the invention can employ non-woven material or a similarly soft fabric as a base material. The sheet heating element can then itself form the comfort layer, and a separate layer forming the comfort layer can be dispensed with.

In additional advantageous applications, the sheet heating element pursuant to the invention can be used for wall or floor heating purposes in a building, or also as heated wallpaper. Furthermore, the sheet heating elements can be integrated into clothing items.

Below, the invention is explained in reference to the drawings. The drawings indicate the following:

BRIEF DESCRIPTION OF THE DRAWINGS

FIG. 2: Schematic illustration of a magazine weft insertion system for the Raschel machine as per FIG. 1.

FIG. 3: Example of a sheet heating element produced using a Raschel machine as per FIG. 1.

FIG. 6: Schematic illustration of a third structure of contact conductors and heat conductors for the sheet heating element pursuant to the invention.

DETAILED DESCRIPTION OF THE DRAWINGS

Figure 1:
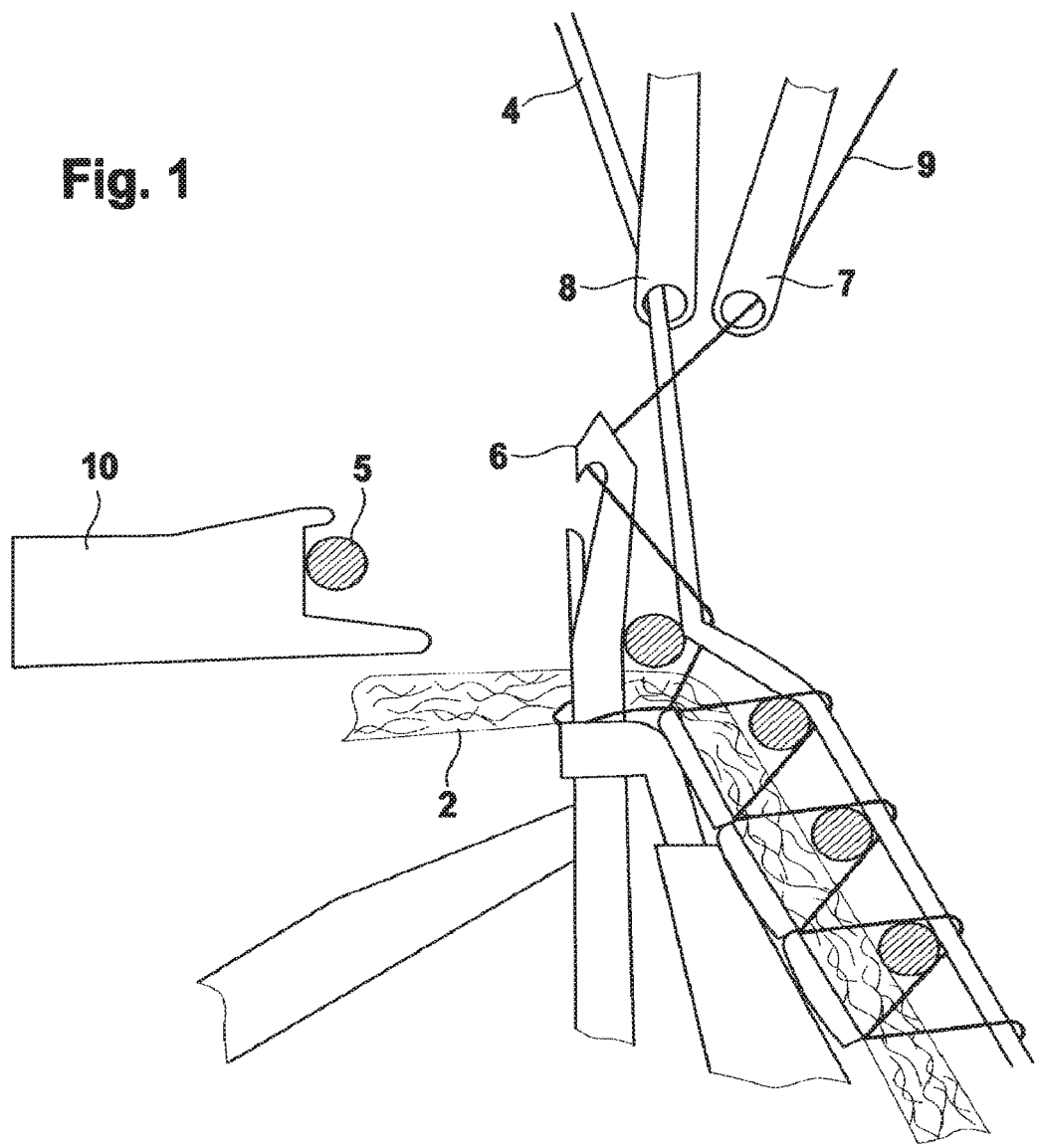
FIG. 1: Schematic illustration of components of a Raschel machine used to produce the sheet heating element pursuant to the invention.

FIG. 1 shows a schematic view of components of a Raschel machine used to produce the sheet heating element 1 pursuant to the invention, where the Raschel machine in this case is designed as a non-weave Raschel machine. FIG. 2 shows a magazine weft insertion system for the Raschel machine as per FIG. 1.

This Raschel machine is used to produce a sheet heating element 1 as per FIG. 3 in such a way that a base material, in this case a non-woven material 2, is pierced by a knitted material that itself is formed by fringe stitches 3. The fringe stitches 3 consist of non-electrically-conductive materials. Heat conductors 4 are inserted as warp threads within this knitted material. Furthermore, contact conductors 5 are inserted as weft threads to act as electrical supply lines for the heat conductors 4. The heat conductors 4 and contact conductors 5 consist of electrically conductive material, such as in particular carbon or also a metallic material.

Figure 1A:
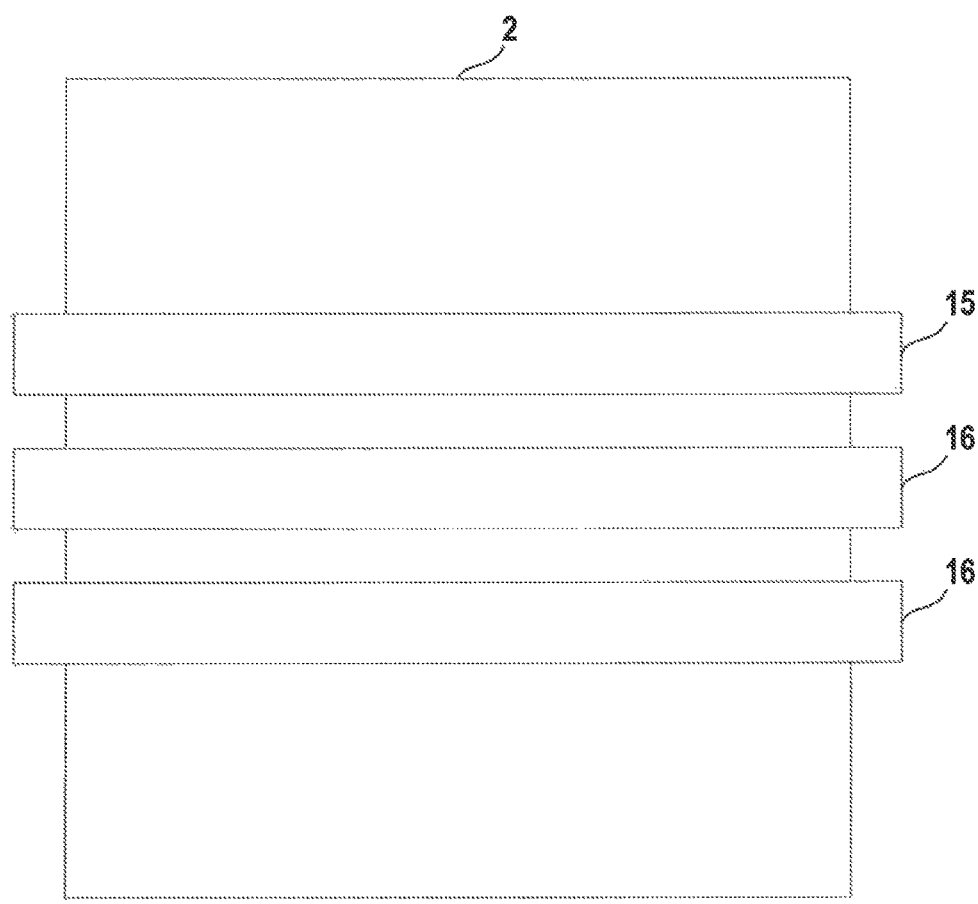
FIG. 1a: Schematic illustration of the guide bars for the raschel machine according to FIG. 1.

As shown in FIG. 1, to produce this knitted material, various types of guide needles 7, 8 of two guide bars 15, 16 are associated with a needle 6, with the thread 9 being threaded through the first guide needle 7 to form the fringe stitches 3 and the heat conductor 4 being threaded through the second guide needle 8. In general, this device can also be extended such that two guide bars 16 are provided to thread two heat conductors 4, FIG. 1a.

Furthermore, FIG. 1 illustrates a slider 10, which is a component of a magazine weft insertion system that is used to insert the contact conductor 5 into the knitted material.

The magazine weft insertion system illustrated schematically in FIG. 2 has two feeding chains 11 running in parallel on which hooks are provided to take up the contact conductors 5 and which each revolve at one conveyance speed. Furthermore, the magazine weft insertion system has a weft carriage 12 running perpendicular to the conveyance direction F of the feeding chain 11, said weft carriage having eyelets 13 in which the contact conductors 5 can be accommodated. The slider 10 shown in FIG. 1 is operated by the weft carriage 12. To insert the contact conductors 5 into the knitted material as weft threads, the weft carriage 12 takes up the contact conductors 5 from the feeding chains 11, as shown in FIG. 2.

Figure 4:
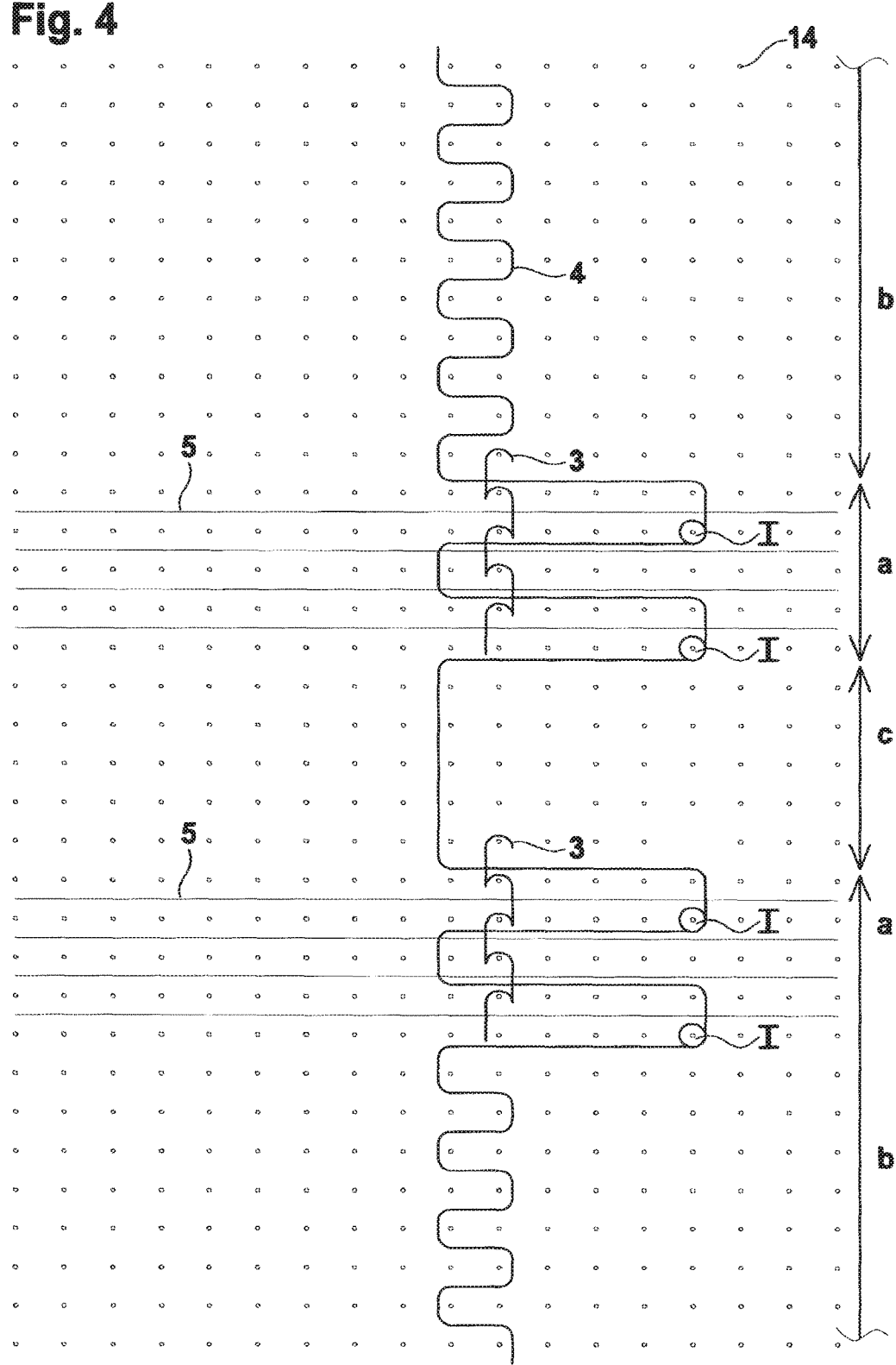
FIG. 4: Schematic illustration of a first structure of contact conductors and heat conductors for the sheet heating element pursuant to the invention.
Figure 5:
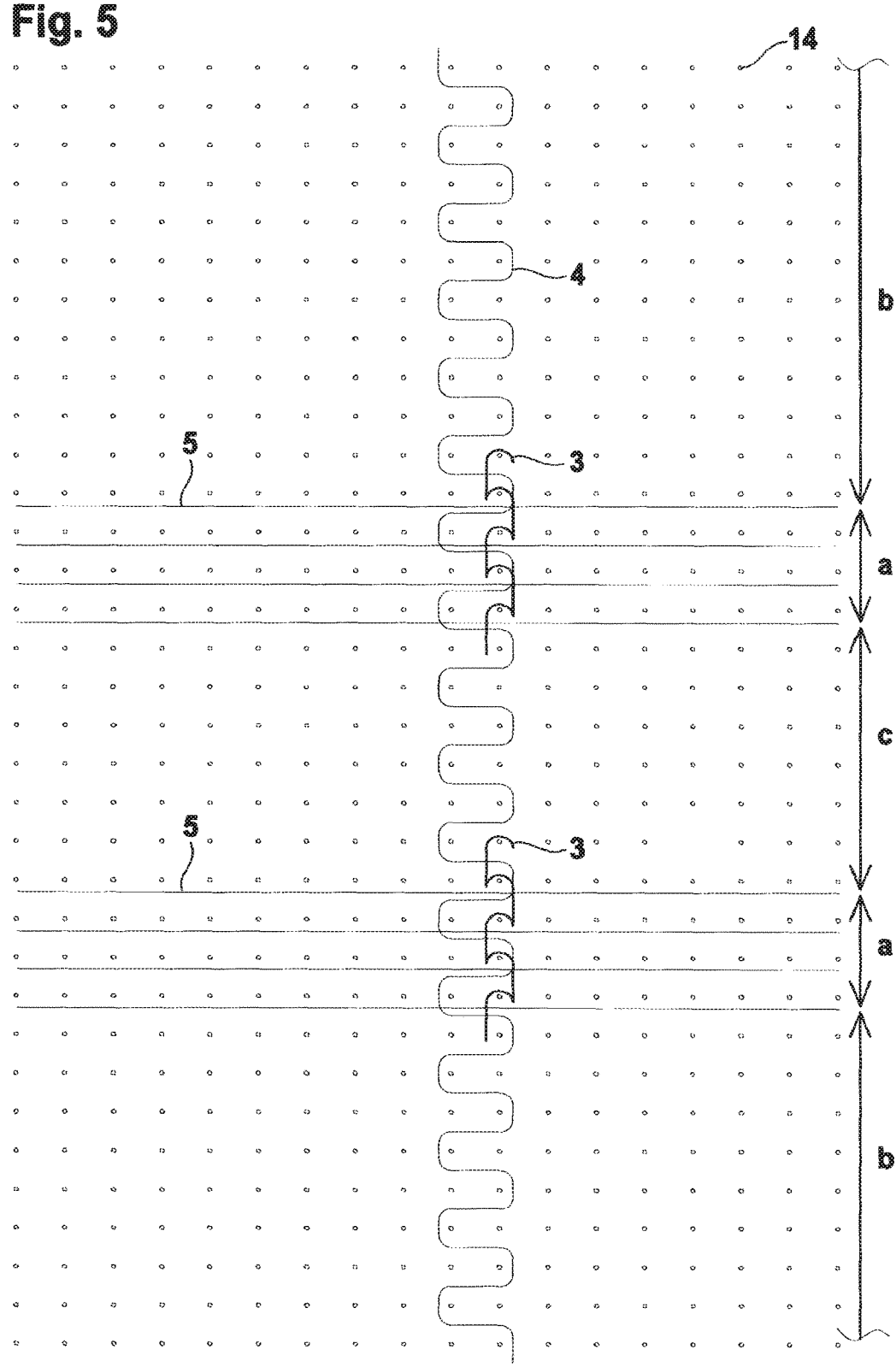
FIG. 5: Schematic illustration of a second structure of contact conductors and heat conductors for the sheet heating element pursuant to the invention.

The contact conductors 5 are inserted only in discrete areas of the knitted material using the magazine weft insertion system and in the process they form the borders of a sheet heating element 1. This is illustrated in FIGS. 4 and 5. In these illustrations, the areas of the sheet heating element 1 that form a heating zone of the sheet heating element 1 are labeled 'b'. The areas with the contact conductors 5 forming the borders of the sheet heating element 1 are labeled 'a'. A cutting area labeled 'c' is located between adjacent areas 'a' having contact conductors 5. In this area, the knitted material with the non-woven material 2 is cut apart following the production process on the Raschel machine, thus yielding multiple separate sheet heating elements 1.

Since the contact conductors 5 are only inserted into the knitted material in discrete areas, the weft carriage 12 is paused when no contact conductors 5 are being inserted. Pursuant to the invention, the feeding chains 11 are also paused along with the weft carriage 12. This prevents excess contact conductor 5 material from being incorporated into the border regions of the knitted material, if the feeding chains 11 continued to run, which would then be rejected as waste at the end of the production process of the sheet heating element 1.

The pause times of the weft carriage 12 and of the feeding chain 11 are controlled by a control unit, which is not illustrated. Parameterizable software for pulse control is implemented in the control unit to control the pause times as a function of stitch formation.

Furthermore, the control unit also controls the production speed of the Raschel machine, and again this control operates as a function of stitch formation. The control is generally implemented in such a way that a slower production speed is selected in areas where the stitch structure of the knitted material is complex and therefore requires a longer processing time than in areas that are less complex. Production speed can be maximized by adjusting production speed in this way to the varying complexity of the structure of the knitted material in specific areas of the material.

The variation of production speed pursuant to the invention is explained below in reference to FIGS. 4 and 5. These illustrate a grid with needle positions 14 to produce the knitted material, the fringe stitches 3 of which are only illustrated locally for the sake of clarity, but they extend over the entire grid.

In the embodiment pursuant to FIG. 4, the heat conductors 4 are formed with an offset of two needle positions 14 in the areas forming the heating zones, i.e. in those areas, the heat conductors 4 do not follow a straight line perpendicular to the contact conductors 5, but rather follow a rectangular zigzag line. For the sake of clarity, FIG. 4 illustrates only one heat conductor 4, however multiple heat conductors 4 are arranged in the knitted material.

In the cutting area 'c', which is later rejected as waste, the heat conductor 4 runs in a straight line so that only a small amount of heat conductor material is required in this area.

In the areas 'a' containing the contact conductors 5, the heat conductor 4 has a larger offset extending over six needle positions 14. This results in the heat conductor 4 being positioned against the contact conductor 5 over a large area, which ensures good electrical contact between the heat conductor 4 and the contact conductors 5. This contact is further improved by the fact that the heat conductor 4 forms stitches (labeled 'I' in FIG. 4) in area 'a', and these stitches surround a contact conductor 5.

As is directly evident from FIG. 4, the knitted material structure is most complex in the areas labeled 'a' and least complex in the areas labeled 'c'. Accordingly, the production speed is controlled so as to be fastest in the areas labeled 'c' and slowest in the areas labeled 'a', while in the areas labeled 'b', the production speed is set at a mean rate between the fastest and slowest.

In the embodiment pursuant to FIG. 5, the heat conductor 4 runs with a constant offset across all the areas, i.e. those labeled 'a', 'b' and 'c'. In this case, a constant production speed can be selected.

FIG. 6 schematically illustrates a heat conductor 4 running in the area of the contact conductors 5, with an offset of +/−1.5 inches in both directions with respect to a base line 0. This offset can be implemented using two separate guide bars 15, 16 for the heat conductors 4. In this case, especially large contact areas are provided between heat conductor 4 and contact conductor 5, which in turn provides good electrical contact.

The invention claimed is:

1. A method to produce a textile sheet heating element, comprising:

forming a knitted material and, in one in the same work step, inserting heat conductors as warp threads in a knitting process and inserting contact conductors that touch the heat conductors at spacings from one another as weft threads or weft thread groups; wherein the step of forming the knitted material includes using a first guide bar to form fringe stitches and using two guide bars to insert the heat conductors in the form of warp threads;

using a warp knitting machine or Raschel machine to produce the sheet heating element and varying a production speed of the warp knitting machine or Raschel machine as a function of stitch formation and, wherein the warp knitting machine or Raschel machine has a magazine weft insertion system with feeding chains to feed in weft threads and a weft carriage to insert weft threads; and pausing both the feeding chain and the weft carriage for preset times as a function of stitch formation.

2. The method according to claim 1, further comprising controlling the production speed and the pause times of the feeding chains and the weft carriage by a pulse controller.

3. The method according to claim 1, wherein the step of using the two guide bars includes using the two guide bars to create differing offsets for the heat conductors perpendicular to a direction in which the feeding chains run.

4. The method according to claim 3, wherein the offsets amount to +/−1.5 inches with respect to a base line.

5. The method according to claim 3, wherein the varying of the production speed includes reducing the production speed in areas where the heat conductors have a large offset compared to areas where the heat conductors have small offsets.

6. The method according to claim 1, further comprising using a non-woven base material and penetrating the non-woven base material by the knitted material, connecting the heat conductors and contact conductors to the base material and fixing the heat conductors and contact conductors in place by the fringe stitches.

7. The method according to claim 1, wherein the inserting the heat conductors includes forming stitches with the heat conductors that surround the contact conductors.

8. The method according to claim 1, further comprising inserting insulation threads into the knitted material as weft threads.

* * * * *